May 5, 1964 H. SCHMID 3,132,338

PARTIAL DIGITIZER

Filed Oct. 14, 1960 2 Sheets-Sheet 1

HERMANN SCHMID
INVENTOR

BY Richard G. Stephens
ATTORNEY

May 5, 1964 H. SCHMID 3,132,338

PARTIAL DIGITIZER

Filed Oct. 14, 1960 2 Sheets-Sheet 2

HERMANN SCHMID
INVENTOR

BY Richard G. Stephens

ATTORNEY 3,132,338
Patented May 5, 1964

3,132,338

PARTIAL DIGITIZER

Hermann Schmid, Binghamton, N.Y., assignor to General Precision, Inc., Binghamton, N.Y., a corporation of Delaware Filed Oct. 14, 1960, Ser. No. 62,663
10 Claims. (Cl. 340—347)

This invention relates to an improved analog-to-digital converter, and more particularly, to what is sometimes termed a "partial" converter. A partial analog-to-digital converter differs generally from other converters in that it provides only part of the analog input signal as a digital output signal, presenting the remainder of the signal as an analog output voltage. In one sense all A/D converters are partial converters if applied to convert any smoothly varying input signal, since a small fraction of the least significant bit may be left as a remainder in any case. The term "partial converter" usually is applied to devices where the "remainder" analog voltage is presented at the output of the machine.

In some A/D converters the time required to make a complete conversion increases exponentially with the number of digits in the output signal, so that carrying some of the digits in the form of an analog signal can decrease the number of digits, and consequently the conversion time, without loss of accuracy.

The present invention includes, as its central concept, a special bi-directional electronic limiter circuit which considerably simplifies the circuitry and increases the accuracy of converters of the type described. Furthermore, some of the particularly advantageous features of the present invention are (1) that the device is self-correcting and insensitive to noise, (2) that conversion is effected rapidly and accurately, and (3) that the circuit is simple and economical.

Thus it is the primary object of the present invention to provide an improved partial digitizer using simple and economical circuitry.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings in which.

Figure 1:
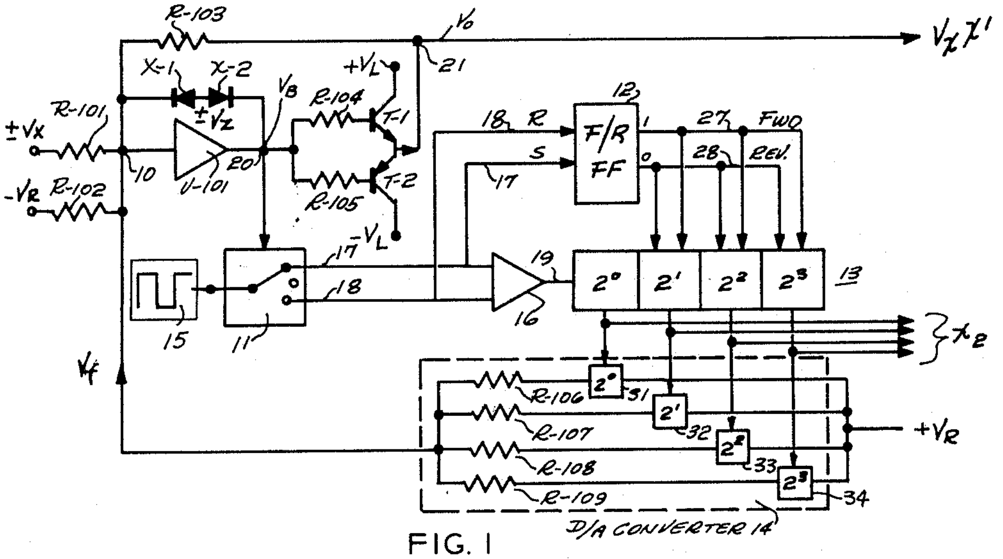
FIG. 1 is a schematic diagram of an exemplary embodiment of the invention.
Figure 2:
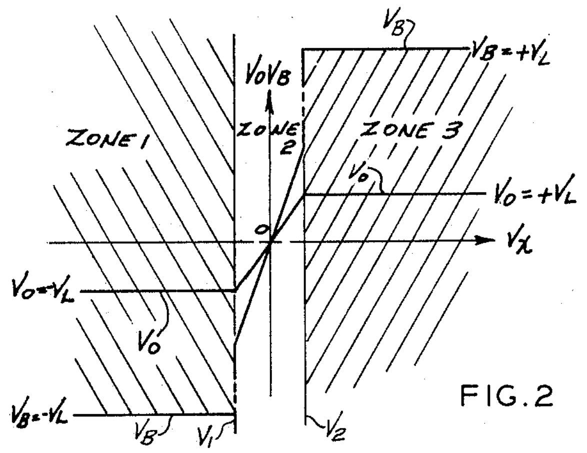
FIG. 2 is a graph helpful in understanding operation of the special limiter circuit portion of the invention.

The embodiment of the invention shown in FIG. 1 may be seen to include a direction gate 11, a directional flip-flop 12, a reversible binary counter 13 shown as having four stages, a set of four transistor voltage switches with associated precision scaling resistors connected to operate as a digital-to-analog converter 14, and a special ideal bi-directional limiter circuit including direct-coupled amplifier U–101, Zener diodes X–1 and X–2, a switch including transistors T–1 and T–2, and associated resistances. The bi-directional limiter is described in detail in my copending application Serial No. 755,292, filed August 15, 1958, now abandoned, and hence only a brief description of it need be set forth herein. The limiter circuit has a characteristic illustrated in FIG. 2, wherein three distinct zones or regions of operation are apparent. In FIG. 2 curve $V_B$ indicates the variation in output voltage of amplifier U–101, at terminal 20, as the input voltage $V_x$ to the amplifier is varied, and curve $V_0$ indicates the variation in the voltage (at terminal 21) from the transistor switch.

In zone 2, the middle or operating region shown in FIG. 2, in which input voltage $V_x$ lies in between lower limit voltage $V_1$ and upper limiting voltage $V_2$, the amplifier operates in ordinary fashion as an amplifier, completely independently of the transistor voltage switch. When input voltage $V_x$, increasing positively, becomes equal to or slightly more positive than upper limit voltage $V_2$, the output voltage $V_B$ at terminal 20 becomes negative with respect to $V_1$, forward-biasing transistor T–2 of the transistor switch and thereby decreasing the feedback current through R–103, raising the closed-loop gain of the amplifier, which in turn makes $V_B$ at terminal 20 even more negative. The action being regenerative, transistor T–2 is driven to saturate quickly and completely, cutting off feedback current, so that $V_B$ will swing negatively as far as $-V_Z$, the negative breakdown voltage of the pair of Zener diodes X–1 and X–2 shown connected back-to-back across amplifier U–101. With transistor T–2 saturated, the output voltage $V_0$ at terminal 21 will be limited accurately to the negative limit value $-V_L$, and voltage $V_B$ at terminal 20 will equal the negative Zener breakdown voltage $-V_Z$. In similar fashion, transistor T–1 utimately will saturate and operate in zone 2 if input voltage $V_x$ is made increasingly negative, so that ultimately $V_0$ at terminal 21 will equal $+V_L$, the upper limiting voltage and $V_B$ at terminal 20 ultimately will equal $+V_Z$, the positive Zener breakdown voltage. The improved A/D converter utilizes both the limiting characteristics and the switching characteristics of the bi-directional limiter circuit to provide improved partial analog-to-digital conversion. Neglecting, for the time being a negative biasing voltage optionally applied via resistance R–102, it will be apparent that output voltage $V_0$ at terminal 21 always will be proportional to the difference between the input voltage $V_x$ and the feedback voltage $V_f$. Since the $V_f$ analog feedback voltage is merely the digital output signal of the partial A/D converter converted into analog form by internal D/A converter 14, it will be understood that $V_0$ is the analog "remainder" which remains after input signal $V_x$ has been digitized or encoded. Thus the total value of a $V_x$ input signal applied to R–101 is specified by the digital output signal from the converter, as indicated by the potential states of a group of lines or terminals labelled $X_2$, plus the analog "remainder" signal $V_0$ at terminal 21.

The device of FIG. 1 has been constructed to handle input signals varying between zero and positive ten volts, with each "bit" of the digital count representing 1.25 volts, so that a binary count "1000" (eight) represents ten volts. Since each "bit" represented 1.25 volts, the analog remainder voltage $V_0$ at terminal 21 was always somewhere between zero and 1.25 volts.

The output voltage $V_B$ from direct-coupled amplifier U–101 at terminal 20 is applied to control direction gate 11, which in turn, drives forward-reverse flip-flop 12, and through OR gate 16, the first or lowest order stage of binary counter 13. Whenever the error voltage, or difference between input voltage $V_x$ and feedback voltage $V_f$, exceeds $+V_L$ in magnitude, the amplifier output voltage $V_B$ at terminal 20 assumes $+V_Z$, the positive zener breakdown voltage, as explained above in connection with FIG. 2, thereby closing gate 11, so that clock pulses from clock pulse source 15 are connected to one of conductors 17 and 18, the "set" and "reset" input lines for flip-flop 12. If the $V_B$ voltage is less positive than the positive limit voltage $+V_L$ and less negative than the negative limit voltage $-V_L$, and therefore lies between $V_1$ and $V_2$, gate 11 remains closed, and the clock pulses from source 15 are not routed anywhere. Whenever voltage $V_B$ equals or begins to exceed $+V_L$ in a positive sense, gate 11 routes clock pulses to "set" conductor 17, and conductor 18 remains disconnected from clock pulses. Conversely, whenever voltage $V_B$ equals or begins to exceed $-V_L$, in a negative sense, gate 11 routes clock pulses from source 15 to "reset" conductor 18, and then provides no pulses on conductor 17. Thus gate 11 performs the functions of an ideal, extremely fast S.P.D.T. switch, selectively connecting clock pulses to either conductor 17 or conductor 18 or to neither, depending upon the polarity and magnitude of the $V_B$ signal.

If $V_B$ assumes $+V_Z$, the connection of positive clock pulses to "set" conductor 17 serves to "set" flip-flop 12 or to leave it in a "set" condition if it already was "set," thereby applying a voltage to the "Forward" input line 27 of the counter. The positive clock pulse on conductor 17 simultaneously passes through OR gate 16 to the counter pulse input line 19 to the lowest order stage of counter 13. With flip-flop 12 controlling counter 13 so that it counts forward, i.e. upwardly, clock pulses passing along conductor 17, through OR gate 16 to counter input line 19, operate the counter toward increasing binary numbers, as, for example, from "000" (zero) to "001" (one), or from "0011" (three) to "0100" (four). If, on the other hand, $V_B$ at terminal 20 assumes $-V_Z$, the connection of positive clock pulses to "reset" conductor 18 serves to "reset" flip-flop 12, or to leave it in a "reset" condition if it previously had been "reset," thereby applying a voltage to the "Reverse" input line 28 of counter 13. The positive clock pulse on conductor 18 simultaneously will pass through OR gate 16 to the counter pulse input line 19, to the lowest order stage of counter 13. With flip-flop 12 controlling counter 13 so that it counts in reverse i.e., downwardly, clock pulses passing along conductor 18, through gate 16 to input line 19, operate the counter toward decreasing binary numbers, as, for example, from "0011" (three) to "0010" (two).

The digital output for the converter is taken from the counter stages, the state of each counter stage indicating whether a respective digit of the output signal is "1" or "0." The digital signal also is converted to analog form by D/A converter 14 to provide an analog feedback signal $V_f$ for comparison with input signal $V_x$. As indicated by FIG. 1, the state of each stage of counter 13 controls a different digit switch of D/A converter 14. If the lowest order stage $2^0$ of counter 13 is "high," i.e. if it is in its "1" state, transistor switch 31 connects a precision reference voltage $V_R$ to apply feedback voltage component through precision scaling resistor R–106. If any other stages of counter 13 are "high," their associated transistor switches (32, 33, 34) connect the reference voltage to their scaling resistors to provide additional feedback voltage components. The scaling resistor of each stage has one-half as much resistance as the scaling resistance associated with its adjacent lower order stage, so that increasing binary counts in counter 13 result in a binary-increasing analog feedback voltage $V_f$. As in any feedback control system, the feedback voltage is degenerative in sense or polarity, so as to tend to decrease the error signal.

If the error signal decreases sufficiently and voltage $V_B$ again lies between the selected limit values $+V_L$ and $-V_L$, direction gate 11 opens, as mentioned above, so that clock pulses do not reach the counter and the counter remains at rest as long as the conditions maintain. Thus direction gate 11 is controlled by the error signal to feed pulses to counter 13 until, and only until, such time that the digital count, when converted to analog form and compared with the input signal, is smaller than the selected limit voltage, or otherwise stated, smaller than the least significant digit of the digital count to be provided. When the error signal is less in magnitude than the selected limit value, directional gate circuit 11 remains completely open, and flip-flop 12, counter 13 and D/A converter 14 remain still, without changing state.

Assuming that each binary digit is assumed to represent 1.25 volts, as mentioned above, further assume that an input voltage of −5.6 volts is applied via scaling resistor R–101. Since 1.25 goes into 5.6 four times with a remainder of 0.6, counter 13 will indicate "four" in binary code (0100), a feedback voltage of 5.00 volts will be generated, and an analog remainder voltage of 0.6 will be present at terminal 21. Only stage $2^2$ of counter 13 will be high, and the connection of reference voltage $V_R$ by switch 33 through resistance R–108 will provide all of feedback voltage $V_f$. Thus initial conditions are assumed. Now, as input voltage $V_x$ is decreased, say to 4.9 volts, analog output voltage $V_0$ at terminal 21 decreases to zero and error voltage $V_B$ at terminal 20 becomes negative, and transistor T–2 saturates, decreasing the feedback current in R–103, thereby making the voltage $V_B$ rapidly become even more negative, until it reaches $-V_Z$, the negative zener breakdown. The switching of $V_B$ to a negative voltage greater in magnitude (more negative) than negative limit voltage $-V_L$ connects counter 13 to run it downwardly, so that binary four (0100) in counter 13 decreases to binary three (0011). Such changes in the status of the counter de-energize or "open" switch 33 and close switches 32 and 31, so that reference voltage now is applied via scaling resistances R–106 and R–107 rather than through R–108. Since resistance R–108 has only one half as much resistance as R–107 and only one-fourth as much as resistance R–106, it will be seen that the change in the counter will decrease the feedback current and voltage $V_f$ to three-fourths of their prior magnitudes, or specifically, $V_f$ will be proportional to 3.75 volts and $V_0$, the analog remainder voltage at terminal 21 will equal $V_x-V_f$, (i.e. 4.9−3.75) or 1.15 volts. Thus it will be seen that the partial A/D converter circuit of FIG. 1 will provide a binary digital output and an analog remainder, or incremental output voltage for any input voltage, that the two outputs properly will track any change in the input voltage, and that the device cannot get "out-of-step" if counts were missed for some reason, and if noise causes a false pulse count the device will correct itself immediately. Biasing voltage $-V_R$ applied via scaling resistance R–102 may be used to arbitrarily bias the circuit of FIG. 1 so that it will accept inputs of either polarity. For example, if an analog voltage of a binary value of "eight" is applied, the circuit will be biased at its mid-position, as counter 13 is capable of counting only between zero and fifteen.

For ease of explanation, it was assumed above that limiting voltages of 1.25 volts are used and that the overall feedback ratio, or ratio between the resistances of R–103 and R–101 was unity. In actual practice, it is more feasible to provide a scale factor of perhaps 8, so that the limiter circuit limits at ten volts instead of 1.25 volts. This is advantageous in that no special low impedance power supply would be required to supply $+V_L$ and $-V_L$, and also because the one millivolt (approximate) error present in the transistor switch of the limiter circuit then causes a much smaller percentage error.

Figure 3:
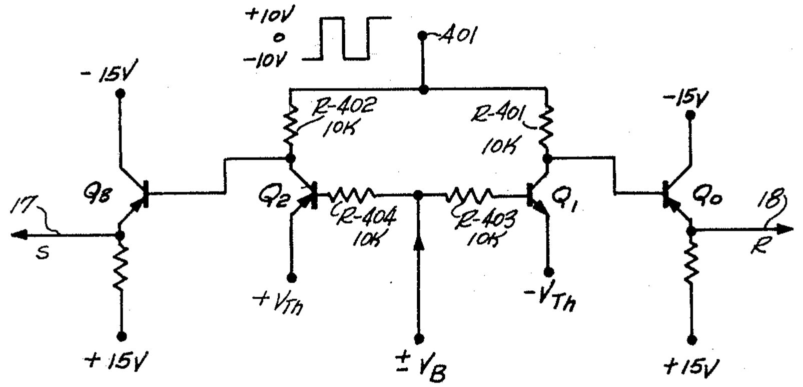
FIG. 3 is a schematic diagram of one type of directional gating or S.P.D.T. switching circuit which may be used as gate 11 in FIG. 1.

The directional gate or direction selector switch circuit 11 is disclosed in FIG. 3 as comprising four transistors $Q_0$, $Q_1$, $Q_2$ and $Q_3$, three of which are of the same conductivity type and one of which is of opposite type. Clock pulses from source 15 are applied between terminal 401 and ground, through resistors R–401 and R–402 to the collector electrodes of the transistors $Q_1$ and $Q_2$. The switching control voltage $V_B$ from terminal 20 is applied via resistors R–403 and R–404 to the base electrodes of transistors $Q_1$ and $Q_2$. Positive and negative threshold voltages, $+V_{Th}$, $-V_{Th}$ are connected to the emitters as shown. The threshold voltages are selected to be equal in magnitude to the value of the lowest order digit, or a few millivolts less than the voltage to be represented by the lowest order digit.

Whenever control signal $V_B$ lies somewhere between $+V_{Th}$ and $-V_{Th}$ both transistors $Q_1$ and $Q_2$ conduct, providing a very low impedance path to ground for the clock pulses, so that only low-amplitude negligible clock pulse voltages appear on "set" conductor 17 and "reset" conductor 18. Whenever switching control signal $V_B$ becomes sufficiently positive to exceed the positive threshold voltage $+V_{Th}$, the base-emitter junction of NPN transistor $Q_2$ becomes reverse-biased, cutting off transistor $Q_2$ and applying the full clock pulse voltage via R–402 to the base of emitter follower transistor $Q_3$, a buffer amplifier stage. Conversely, whenever switching control voltage $V_B$ becomes sufficiently negative to exceed the negative threshold voltage $-V_{Th}$, the base-emitter junction of PNP transistor $Q_1$ becomes reverse-biased, cutting off transistor $Q_1$ and allowing the clock pulses to be applied through the $Q_0$ emitter follower buffer stage to "reset" line 18.

Figure 4:
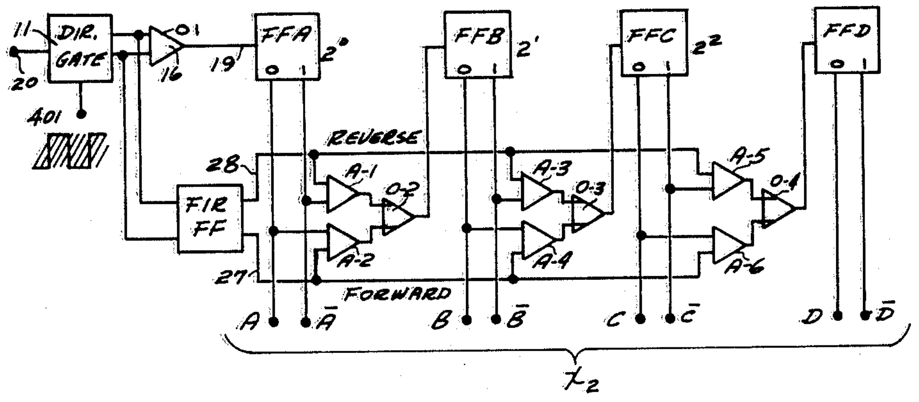
FIG. 4 is a schematic diagram of a conventional binary counter which may be used as counter 13 in FIG. 1.

An exemplary form of reversible binary counter is shown in FIG. 4. The state of flip-flops FFA, FFB, and FFC represent the values of the first, second and third order digits. Flip-flop FFD is used to indicate the sign of the number in the counter, and flip-flop F/RFF controls whether the counter counts forward or reverse when an input pulse is applied. While only three digit stages are shown, it will be appreciated that similar stages may be added to the extent desired. Since the counter is quite conventional, no detailed explanation of its operation need be set forth herein. The digital-to-analog converter 14 also is conventional. For best accuracy the exact values of each of the precision scaling resistors or the reference voltage attached to each such resistor should be adjusted to compensate for the voltage drop at saturation across its associated switching transistor.

In some embodiments of the invention those skilled in the art might substitute a Schmitt trigger and a gating circuit for the direction gate and direction flip-flop arrangement shown. To obtain still faster conversion speeds, the reversible binary counter 13 shown herein may be replaced by various other known conversion schemes which switch in each digit successively, beginning with the highest order digit and skipping digits which do not change error signal polarity.

Figure 5:
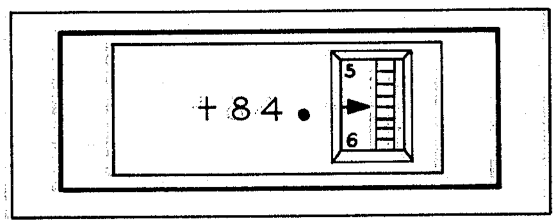
FIG. 5 is a view of the face of an instrument constructed in accordance with the invention, where part of the output is presented in digital form and part presented in analog form.

As well as being useful to operate the hybrid function generator shown in my abovementioned copending application, the instant invention may find use as a partial digital voltmeter such as shown in FIG. 5. Conventional digital voltmeters are pure A/D converters, and their accuracies are limited by the least significant digit. If the input to a conventional digital voltmeter has a ripple amplitude larger than the least significant digit, as often may be the case, the display of the digit is unstable and cannot be read. With the instant invention the digital output may be applied to operate plural stages of any one of a number of different types of indicators, such as Nixie tubes, and the analog output may be applied to operate a conventional D'Arsonval movement with a vertical scale to indicate the least significant part of the output. If a decimal display is desired, a conventional binary to decimal decoding circuit is required between the output lines $X_2$ and the indicators. An arrangement such as shown in FIG. 5, to be provided with 0.05% accuracy requires only two decimal digits and one voltmeter, but it gives close to four digit accuracy. The D'Arsonval movement integrates out the ripple for most ripple frequencies encountered, so that the least significant digits are not unstable. Since use of the hybrid converter of the invention reduces drastically the amount of digital switching required, the invention may be manufactured much more economically than conventional contemporary digital voltmeters having the same accuracy.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawing shall be interpreted as illustrative and not in a limiting sense.

Having described my invention, what I claim as new and desire to secure by Letters Patent is:

1. An electronic partial digitizer for converting an input voltage into output analog and digital signals together commensurate with said input voltage, comprising in combination: a bi-directional limiter circuit to which are applied said input voltage, a feedback voltage, and upper and lower limit reference voltages, said limiter circuit being operable to establish an analog output potential commensurate with the difference between said input voltage and said feedback voltage at an output terminal whenever said difference lies between said upper and lower limit reference voltages, and being operable to establish a switching control potential of first or second polarity with respect to a reference level whenever said difference exceeds one or the other of said limit reference voltages; an electronic digital register having a plurality of stages; the states of said stages representing said output digital signal; gating means controlled by the presence of said switching control potential for changing the state of said register in a direction dependent upon the polarity of said switching control potential; and a digital-to-analog converter circuit connected to said register to provide said feedback voltage.

2. Apparatus according to claim 1 in which said bi-directional limiter circuit comprises a direct-coupled amplifier connected to receive said input voltage, said feedback voltage, and said analog output potential, and a transistor switching circuit connected to receive the output voltage from said amplifier and said upper and lower limit reference voltages and to establish said analog output potential at said output terminal.

3. Apparatus according to claim 1 in which said electronic digital register comprises a reversible binary counter, and in which said gating means is operable to control the application of clock pulses to said binary counter.

4. Apparatus according to claim 1 in which said digital-to-analog converter circuit comprises sensing means for sensing the state of each stage of said digital register, a plurality of scaling resistances, and switching means controlled by said sensing means for applying a voltage to selected ones of said scaling resistances to provide said feedback voltage.

5. Apparatus according to claim 2 in which said transistor switching circuit comprises a pair of first and second transistors of unlike conductivity type, the base electrode of each transistor being connected to receive said amplifier output voltage, the collectors of said transistors being connected to said upper and lower limit reference voltages, respectively, and the emitters of said transistors being connected to said output terminal.

6. Apparatus according to claim 2 having a pair of oppositely-poled diodes connected in series between the output and input circuits of said amplifier, to limit the maximum voltage excursions of said amplifier.

7. Apparatus according to claim 3 in which said gating means includes means responsive to the polarity of said switching control potential for determining whether said clock pulses increase or decrease the number registered in said counter.

8. A partial analog to digital converter comprising an input terminal; a first and a plurality of second output terminals; means for applying to said first terminal an analog potential; first means coupled to said input terminal for providing at said plurality of second output terminals binary signals representative of the magnitude of said analog potential; second means coupled to said input terminal for providing at said first output terminal an analog signal representative of the magnitude of the difference between the value of said analog potential and the value of the digital number represented by said binary signals.

9. The converter of claim 8 wherein said first means includes a comparison type analog to digital converter.

10. The converter of claim 9 wherein said second means controls the operation of said first means when said difference between the value of said analog potential and the value of the digital number represented by said binary signals exceeds a predetermined threshold.

References Cited in the file of this patent

UNITED STATES PATENTS

| | | |
|---|---|---|
| 2,754,503 | Forbes | July 10, 1956 |
| 2,940,306 | Lozier | June 14, 1960 |